Jan. 9, 1962    G. UGOLINI ETAL    3,016,154
GARAGE

Filed March 12, 1959    7 Sheets-Sheet 1

INVENTORS:
Giorgio UGOLINI
U. VIALE
BY: Wenderoth, Lind & Ponack
Att'ys

Jan. 9, 1962  G. UGOLINI ETAL  3,016,154
GARAGE
Filed March 12, 1959  7 Sheets-Sheet 2

INVENTORS:
Giorgio UGOLINI
U. VIALE
BY: Wenderoth, Lind & Ponack
Attys

Jan. 9, 1962 G. UGOLINI ETAL 3,016,154
GARAGE

Filed March 12, 1959 7 Sheets-Sheet 3

INVENTORS:
Giorgio UGOLINI
U. VIALE
BY: Wenderoth, Lind & Ponack
Attys

Jan. 9, 1962    G. UGOLINI ETAL    3,016,154
GARAGE
Filed March 12, 1959    7 Sheets-Sheet 5

INVENTORS:
Giorgio UGOLINI
U. VIALE
BY Wenderoth, Lind & Ponack
Attys

Jan. 9, 1962  G. UGOLINI ETAL  3,016,154
GARAGE

Filed March 12, 1959  7 Sheets-Sheet 6

INVENTORS:
Giorgio UGOLINI
U. VIALE
BY:
Wenderoth, Lind & Ponack
Attys

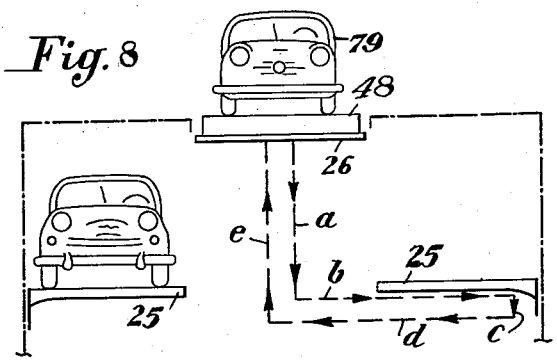
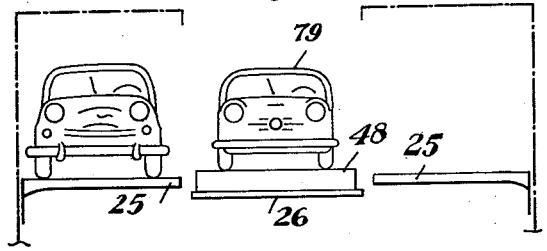
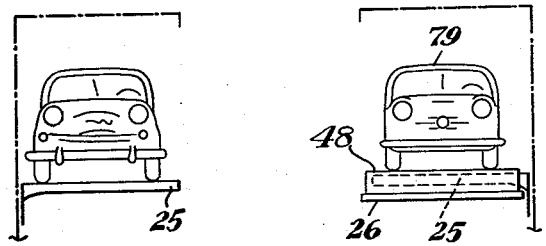

United States Patent Office 3,016,154
Patented Jan. 9, 1962

3,016,154
GARAGE
Giorgio Ugolini, Rome, and Ugo Viale, 31 Via San Marino, Rome, Italy; said Ugolini assignor to said Viale
Filed Mar. 12, 1959, Ser. No. 798,937
Claims priority, application Italy Mar. 14, 1958
5 Claims. (Cl. 214—16.1)

The present invention relates to an underground garage, provided with an automatic system for storing the motor vehicles therein and retrieving therefrom the stored motor vehicles.

The continuous and large increase in the number of motor vehicles in recent years has made the problem of parking spaces very important. This problem is particularly serious in the great towns, where the increase in the number of vehicles corresponds to increasingly less space for the parked vehicles.

An object of the present invention is to provide an underground garage into which the motor vehicles are stored on horizontal support members which are equidistantly spaced and superposed, and having an outline substantially corresponding to the plan outline for a motor vehicle. The area which the garage occupies on the surface of the ground is kept to a minimum.

According to this invention, there is provided a well having a parallelepiped or cylindrical cross section, along the walls of which are mounted spaced support shelves, each including a set of brackets or tubular rails arranged in side-by-side relationship, a platform capable of moving vertically in a vertical open space which is left between said shelves, and which can be stopped on a level with the shelves and moved horizontally toward and away from the shelves. The movable platform is provided with cross-wise extending ridges or tubular rails which are so arranged that, when the platform is horizontally moved, they move between the brackets or tubular rails forming the shelves.

The dimensions of the shelves and of the movable platform are slightly greater than the plan contour of a motor vehicle, so that the surface area is reduced to a minimum.

This invention will be now described with reference to the attached drawings showing by way of example, a preferred embodiment of this invention.

FIGS. 1 and 1A together show a sectional elevation view of an embodiment of the garage according to the invention, the section being taken along line I—I of FIG. 2.

FIGS. 8-10 are diagrammatic partial elevation views of the upper part of the garage of FIG. 1 showing the steps of parking a vehicle.

Figure 1:
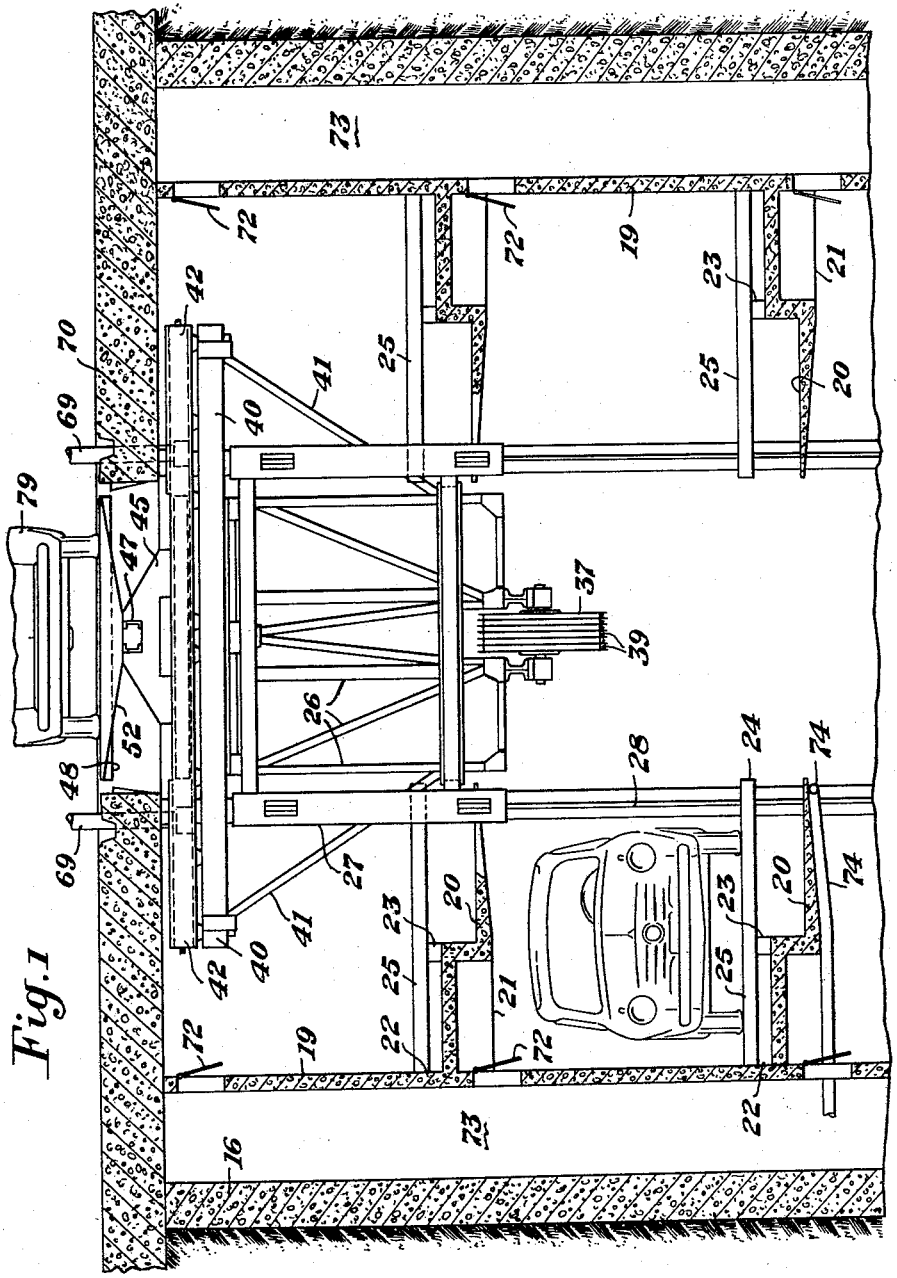
Figure 1A:
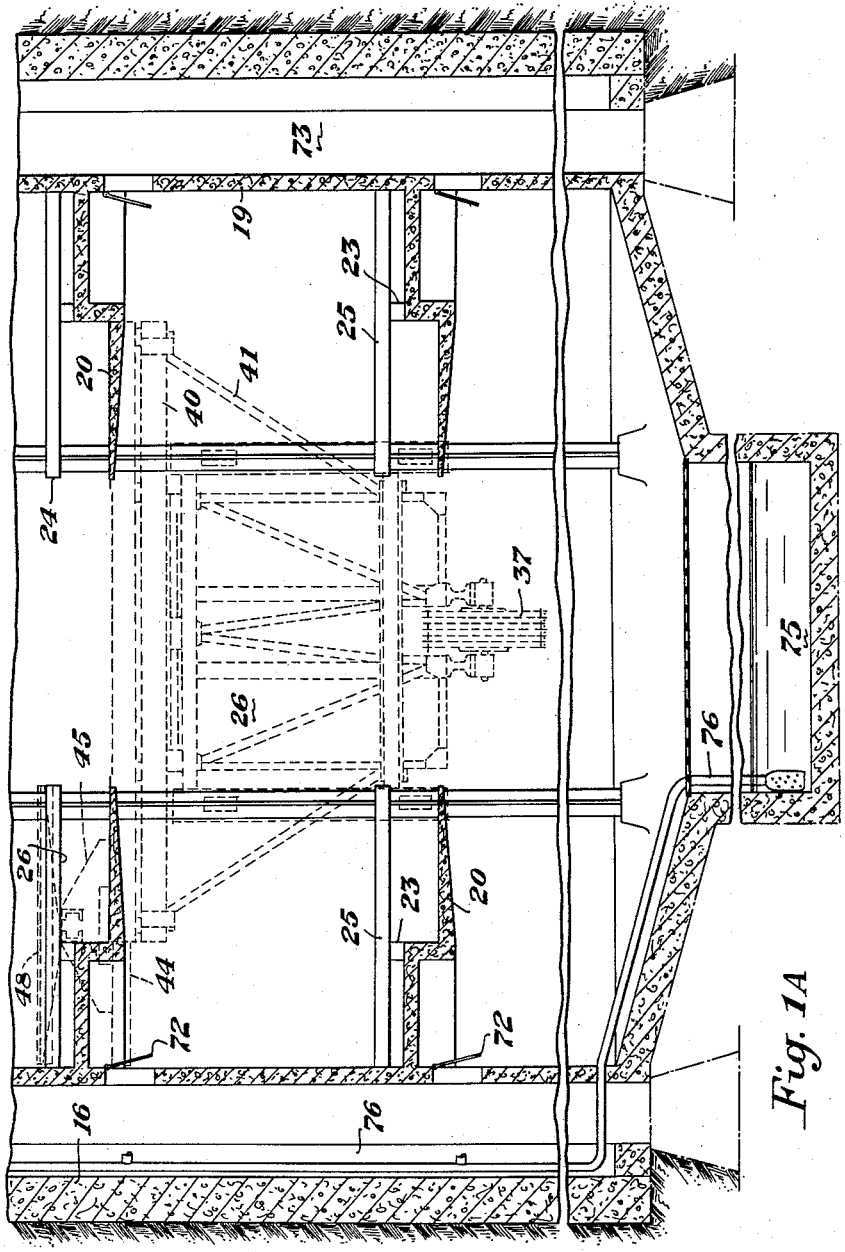
Figure 2:
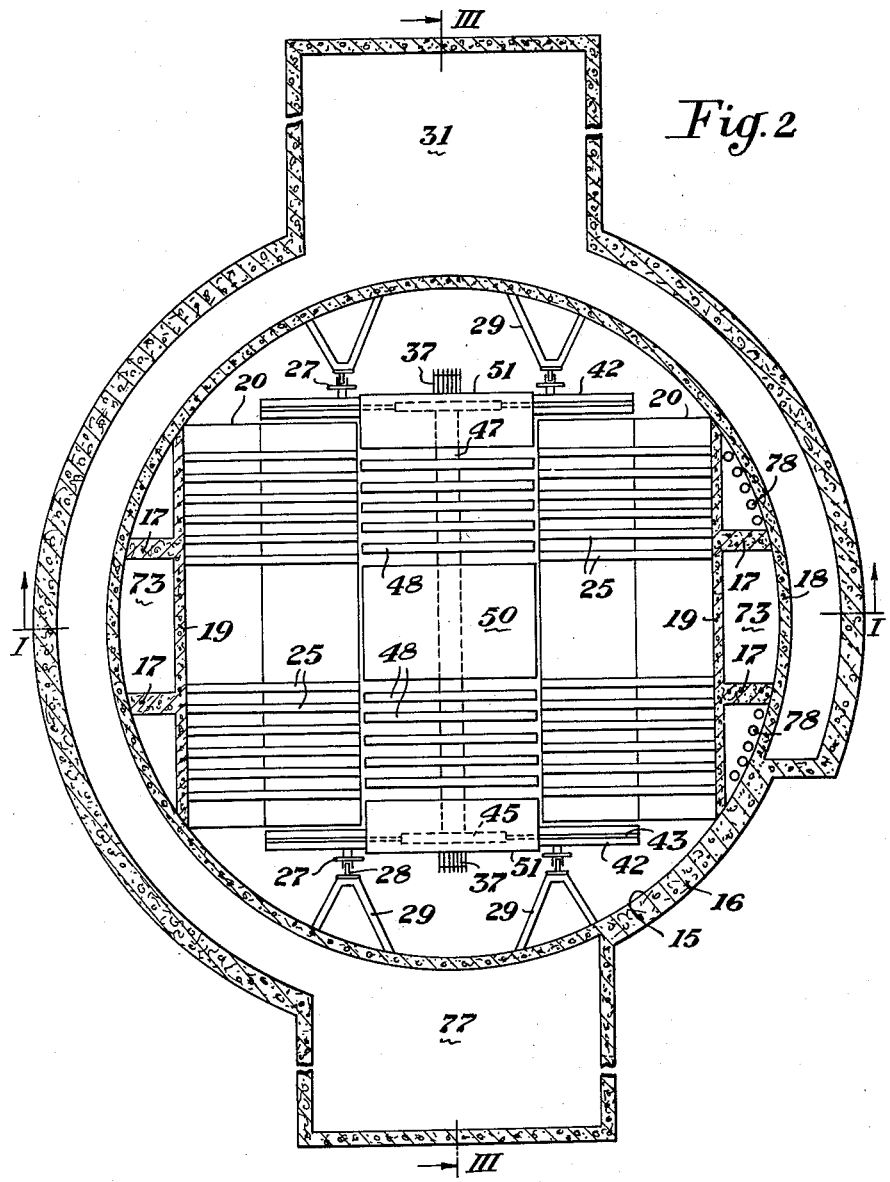
FIG. 2 shows a top plan view, partially sectioned along a horizontal plane, of the embodiment illustrated in FIGURES 1 and 1A.

With reference to FIGURES 1, 1A and 2, the reference numeral 15 denotes a cylindrical recess defined by the masonry or reinforced concrete structure 16 extending downwardly from the roadway.

Within the recess 15 are provided pillars 17 located between the vertical cylindrical wall 18 and flat wall 19 and along which pillars are arranged, in superposed spaced relationship, cantilevered slabs 20 supported by the brackets 21 fixed to the pillars. On each slab is a shelf 25 which is comprised of two spaced rows of tubular elements, each of which is provided with a fixed portion 22 fastened to the wall 19, an intermediate support 23 carried by the slab 20 and an outer free end 24.

In the central zone of the well, between the shelves 25 is a vertically movable hoist, having a metal frame 26 provided with the runners 27 sliding on the vertical guides 28 fastened to the well structure by the stirrups 29.

The vertical movement of the hoist is produced by a hoist motor 30 (see also FIGURE 3) mounted in the recess 31 just under the roadway and accessible through a manhole (not shown). From said motor 30 there extends a set of metal ropes 39 arranged side-by-side, each rope having one of its ends 32 fixed to the weights 33 after they pass over a sheave 34, while the other end of each rope, after having passed around a sheave 35 and 36 mounted on the well structure, is wound on idler sheaves 37 rotatably mounted on the lower central portion of the hoist frame 26, and is then anchored at 38 to the reinforced concrete structure.

On the upper portion of the hoist frame 26 are mounted two cross beams 40 rigidly connected to the frame 26, the ends of said beams being supported by the struts 41. On each cross beam 40 is fastened a metal element 42, (see FIG. 4) having a hollow interior which is substantially rectangular in cross section and which is provided with a longitudinal slot 43 extending along the length of the upper face of the element.

Figure 4:
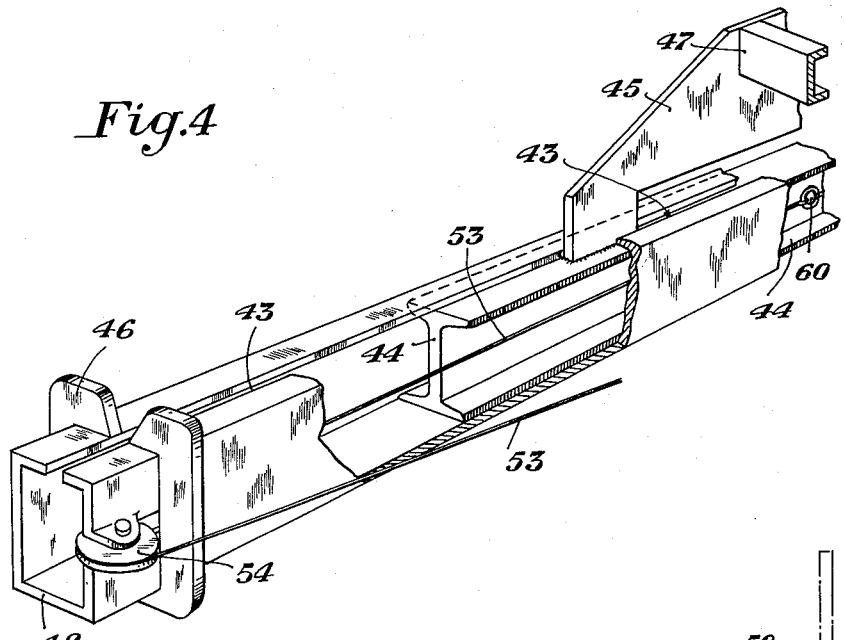
FIG. 4 is a partially sectioned perspective view of a part of the garage illustrated in FIG. 1.

Inside each hollow element 42 is slidably mounted an I beam 44, the length of which is about one half of the length of the element 42. To the upper element of each slidable beam 44 is rigidly connected a support 45 the thickness of which is such as to allow the support to slide along the slot 43. In order to permit the movement of the support 45, as depicted in FIGURE 4, the stiffening collars 46 on the element 42 are split in line with the slot 43. The supports 45 are rigidly connected by a beam 47 on which a platform is mounted. The platform has two parallel rows of spaced tubular elements 48, having shapes and dimensions equal to those of the elements forming the shelves 25. The elements 48 are connected to the beam 47 by posts 49 located in the central part thereof. The platform also has a flooring 50 between the two rows of tubular elements 48, and by two end floors 51 fastened to the beam 47 by ribs 52. It is to be noted that, as is shown in FIGURE 2, the tubular elements 48 of the platform are aligned with the spaces between the corresponding elements of the shelves.

Figure 3:
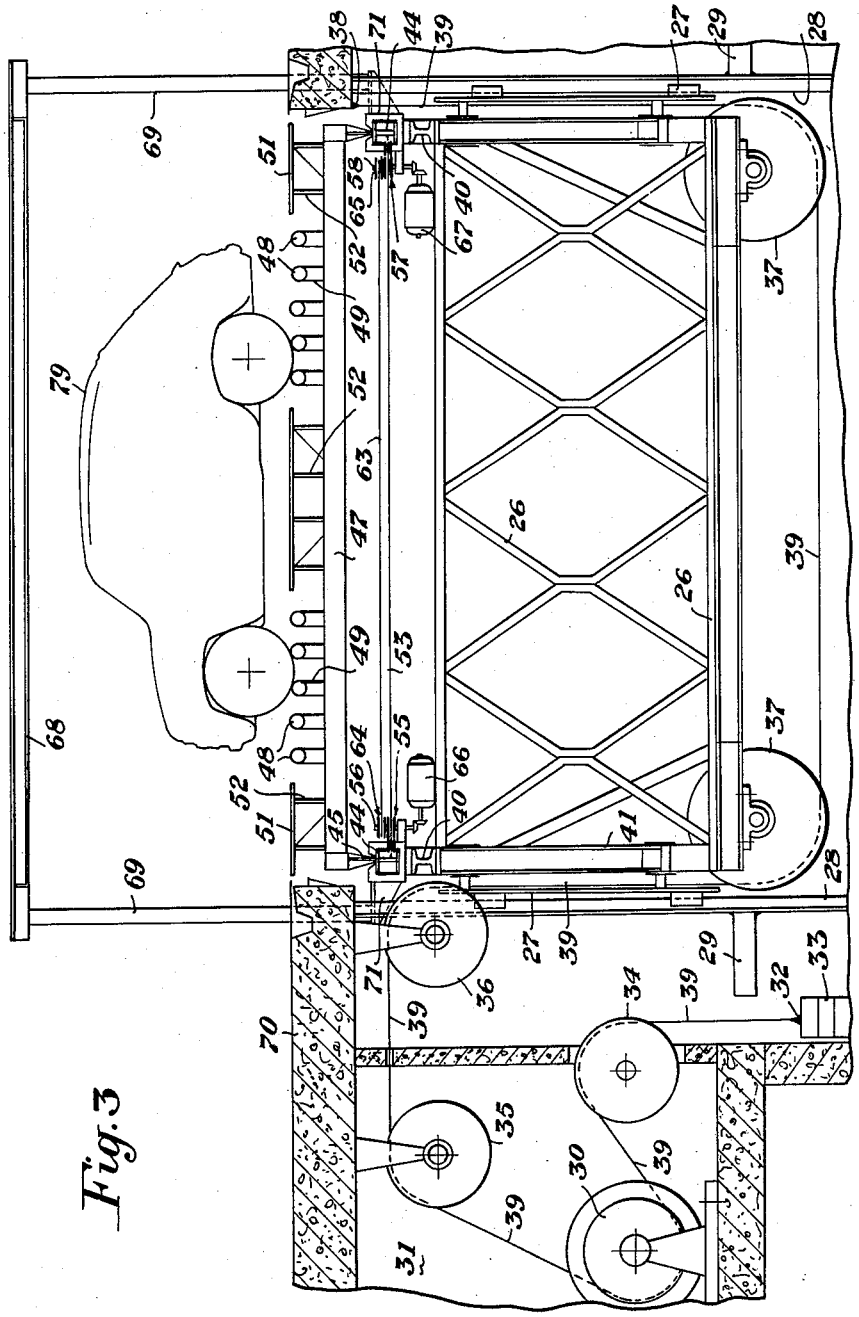
FIG. 3 is a partial view of a section taken along line III—III of FIG. 2.
Figure 5:
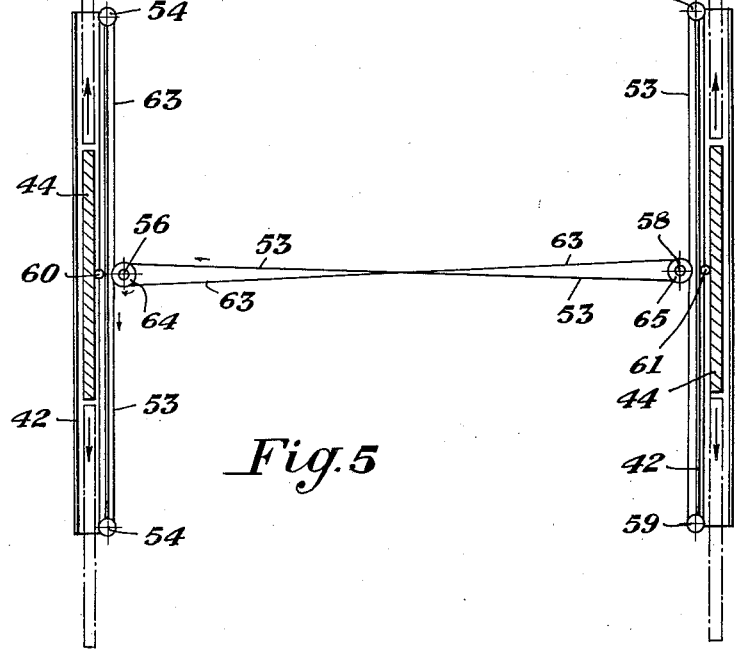
FIG. 5 is a partial diagrammatical plan view of the structure shown in FIG. 3 with the upper part removed, showing the means for moving the vehicle supporting platform laterally.

The unit forming the platform is carried by the hoist frame and is capable of moving in a horizontal plane with respect to said hoist, as will be hereinafter described, with particular reference to FIGURES 3, 4 and 5.

To the center of each slidable beam 44 is anchored one end 60 of a metal rope 53, the rope extending along said beam and around an idler sheave 54 mounted on one of the ends of the hollow member 42, to a sheave 55 mounted on the shaft 56, running then around the pulley 57 mounted on the shaft 58, around the pulley 59 mounted on the opposite end of the other hollow member 42 and finally being anchored at its other end 61 to the center of the other slidable beam 44.

A second rope 63, also having its ends anchored to the points 60 and 61 of the centers of the two slidable beams, extends along a path symmetrical to the aforedescribed one, extending about the sheaves 64 and 65 mounted on the shafts 56 and 58, respectively. Said shafts are journaled in supports mounted on the hoist frame and are actuated by the electric motors 67 and 68, one of which is normally operated, while the other motor is kept in reserve. As shown in FIGURES 3, 4 and 5, the rotation of one of the shafts 56 or 58 causes the simultaneous horizontal movement of the slidable beams 44 (and therefore of the platform mounted thereon) in one or the other direction, until the platform reaches one or the other of the positions in dotted lines in FIGURE 5.

Over the inlet to the well (FIGURE 3) is mounted a movable roof 68 supported by the posts 69 which are capable of sliding within bores provided in the cover slab 70 and which rest on brackets 71 carried by the hoist. When the latter is lowered, the roof 68 is also lowered until it rests over the inlet to the well, substantially level with the roadway.

For the ventilation of the well, in order to remove possible accumulations of gasoline vapors and to avoid the "piston effect" due to the movement of the hoist, the window flaps 72 are provided which establish communication from the inside of the well to the hollow space 73 from which air can be discharged to the atmosphere.

As far as fire prevention equipment is concerned, the pipes 74 are provided under the slabs 20, and will deliver water under pressure, said water being collected in the basin 75 (FIGURE 1A) and drawn off through the pipe 76 leading to a pump unit (not shown) which can be mounted in the recess 77 (FIGURE 2). A fire extinguisher can also be loctaed in the recess 77, wherefrom originate pipes 78 (FIGURE 2) which direct onto each shelf, either simultaneously or selectively, a foam jet or other fighting substance. Furthermore, it will be possible to provide the instrumentalities for signalling the start of a fire, the power units for the operation in case of failure of electric power from the distribution network, and the means for allowing the access to the inside of the well for the necessary repairs or for emergency conditions. This auxiliary equipment is not described since it does not fall within the scope of this invention.

Figure 6:
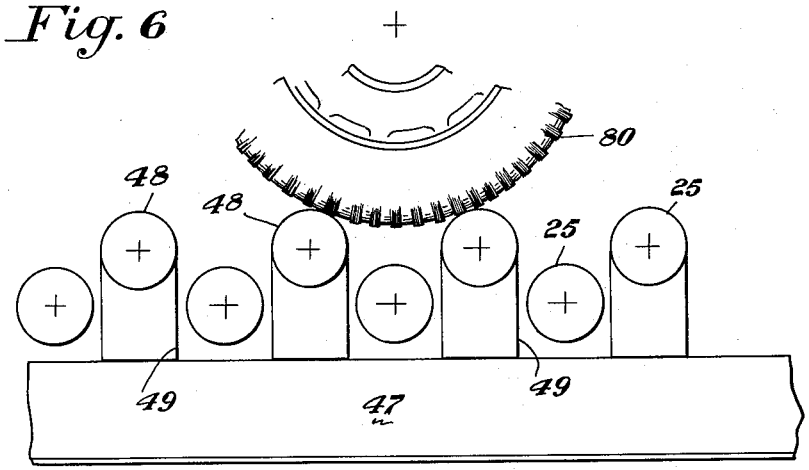
FIGS. 6 and 7 show, in diagrammatic form, a partial section along a shelf of the embodiment of FIG. 1, during the last step in the parking of a vehicle.
Figure 7:
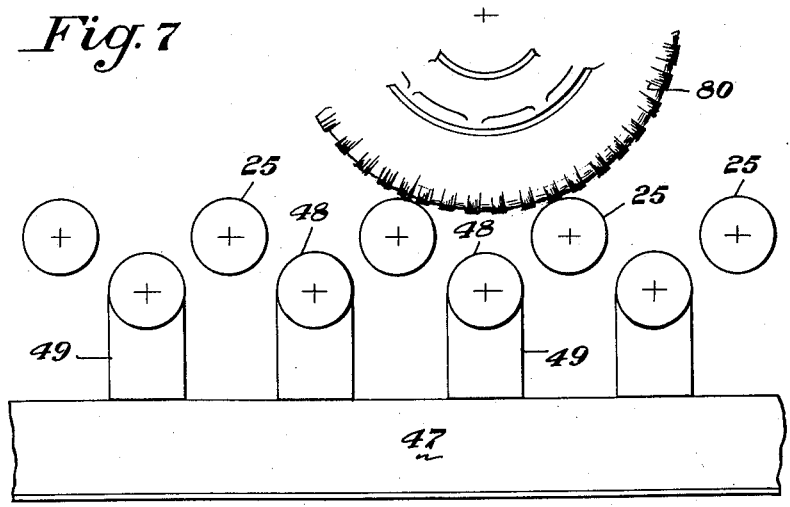

In order to carry out a vehicle storing operation, for instance for the motor car 79, the operator after having ascertained the availability of a shelf, through a control board (not shown) controls the descent $a$ (FIG. 8) of the hoist, which when it has reached a location spaced a few centimeters above the available shelf 25 is stopped (FIG. 9). At this point the platform carries out its horizontal traversing movement $b$ until reaching the position shown in FIG. 10 with the platform elements 48, on which rest the wheels 80 of the car, located slightly above the elements of the shelf 25 (FIG. 7). From this location, the hoist is lowered a short distance $c$ sufficient to cause the wheels 80 to rest on the shelf 25 (FIGURE 6), and then, through a horizontal traversing movement $d$, the platform again moves to its central location and the hoist is raised along path $d$ to its starting position. The operations for retrieving a motor car are carried out in the reverse order.

While a specific embodiment of the invention has been shown and described in detail to illustrate the application of the principles of the invention, it will be understood that the invention may be embodied otherwise without departing from such principles.

We claim:
1. A garage for parking automotive vehicles which comprises a well casing vertically positioned below the ground, a hollow cylindrical structure vertically positioned in said well casing, said structure being spaced from the inner surface of the well casing to leave an air space, said hollow structure having two flat vertical walls, two vertical pillars connected between the inner surface of the structure and said walls and defining between the inner surface of the hollow structure and said vertical walls and on diametrically opposite sides of the well three vertical channels disposed side by side and communicating with the inside of the cylindrical structure, a plurality of vertical guides fixed to the inner surface of the said cylindrical structure between the said vertical flat walls, said well casing having vertically extending recesses on opposite sides thereof, said recesses being in communication with the space above ground and with the inside of the said cylindrical structure, two pluralities of horizontal shelves, the shelves being vertically spaced from each other, said two pluralities of shelves being symmetrically arranged on the said two flat vertical walls and laterally spaced from each other so as to define a central vertical space therebetween, a hoist movable vertically in the said vertical space between the said two pluralities of horizontal shelves and guided by the said vertical guides, said horizontal shelves comprising cantilevered slabs fastened to the said vertical flat walls and a plurality of tubular elements supported by said slabs and distributed in two spaced rows, said tubular elements being parallel to and spaced from one another and having a free end projecting toward the central vertical space, said tubular elements being arranged to support a vehicle, a winch, a motor connected to the winch, the winch being located in one of the said recesses adjacent to the cylindrical structure, a plurality of sheaves rotatably mounted on the walls of the said one recess and a plurality of sheaves rotatably mounted on the lower outer surface of the hoist, metal rope means mounted on the said winch and extending over the said sheaves and moved by the winch, said rope means having one end fixed to the cylindrical structure, counterweights connected to the other end of the said rope means and moving in the central one of the said three vertical channels adjacent to the said flat vertical walls, said hoist consisting essentially of a platform on the upper part thereof having a plurality of tubular elements parallel to and positioned to interleave the tubular elements on the said slabs, the upper surfaces of said tubular elements of the platform forming a supporting plane for a vehicle, said supporting plane being at a height greater than the height of the supporting plane formed by the upper surfaces of the tubular elements on the said slabs when the platform is level with one of the said horizontal shelves for parking a vehicle on the said shelf, whereby said platform can be caused to perform a vertical motion together with the hoist to reach the level of a desired shelf, a horizontal motion on the hoist in one of two opposite directions to bring the tubular elements of the platform in interleaved position between the tubular elements on the said slabs, a vertical motion together with the hoist with respect to the tubular elements on the slabs, a horizontal motion on the hoist to bring said movable platform back again to the center of the hoist in the said cylindrical structure, and a vertical motion in the said cylindrical structure for parking a vehicle on a horizontal shelf, and can be caused to move in the opposite direction when the vehicle is removed from the said horizontal shelf.

2. A garage as claimed in claim 1, wherein the hoist is formed of a metal lattice work and has two beams extending transversely of the hoist on the upper part of the lattice work and parallel to the said tubular elements on the said platform, a metal parallelepiped member fastened on each of the said beams, said metal member having a hollow therethrough in the longitudinal direction thereof and having a longitudinal slot in its upper surface coextensive with the said surface, a T shaped beam having a length substantially half the length of the hollow member, and slidable in the said hollow member, a support rigidly fastened to the upper surface of the T shaped beam and sliding in the said longitudinal slot, a second beam carried by the said support, said platform being mounted on the said second beam, said tubular elements forming said platform being in two groups, said platform further comprising a central flooring between the two groups of tubular elements and two end floorings adjacent to the outer sides of the said two groups of tubular elements, the upper surface of the said central and end floorings being flush with the upper surface of the said tubular elements of the platform, two metal ropes each having one end fixed to the central part of one of the said T shaped beams and directed in opposite directions and fixed at the other end to the central part of the other one of the two T shaped beams, a sheave mounted at each of the two ends of the said hollow member and supporting and guiding the said ropes, two shafts rotatably mounted at two ends of the hoist adjacent said hollow members, motor means for rotating the said shafts, a pair of sheaves mounted on each of the said rotating shafts supporting and guiding the said two ropes along their path from the one to the other of the said T shaped beams, said metallic ropes moving said platform transversely in one of two opposite directions to move the tubular elements of the platform into interleaved position with the tubular elements of the said slab of a horizontal shelf.

3. A garage as claimed in claim 1 which further comprises a movable roof, a plurality of posts supporting the said roof, brackets fixed at the upper part of the hoist, said roof being vertically movable in the said brackets together with the said hoist to lower therewith until the roof contacts the ground thus closing the upper opening of the well when the hoist moves downward in the well for parking a vehicle on a desired horizontal shelf.

4. A garage as claimed in claim 1 which further comprises a plurality of windows in the sides of the cylindrical structure having hinged covers thereover, which windows connect the said air space with the inside of the cylindrical structure to permit the passage of the air during the movement of the hoist.

5. A garage as claimed in claim 1 which further comprise a plurality of pipes positioned under the said slabs to supply water under pressure, and a basin located at the bottom of the well to collect the water supplied by the said pipes.

References Cited in the file of this patent

UNITED STATES PATENTS

| 2,647,647 | Alimanestiano | Aug. 4, 1953 |
| 2,799,406 | Alimanestiano | July 16, 1957 |
| 2,858,032 | Morley | Oct. 28, 1958 |

FOREIGN PATENTS

| 262,207 | Switzerland | Sept. 16, 1949 |